United States Patent

Kirchner et al.

[11] Patent Number: 6,011,234
[45] Date of Patent: Jan. 4, 2000

[54] DEVICE FOR WELDING TOGETHER AT LEAST TWO PARTS AND METHOD OF USING THE DEVICE

[76] Inventors: Eduard Kirchner, St. Martin Stsrasse 8, Appenweier, Germany, 77767; Carsten M. Claussen, Keithatrasse 12, Berlin, Germany, 10787; Hartmut Ilch, Gartenstrasse 14, Kehl, Germany, 77694

[21] Appl. No.: 08/793,086
[22] PCT Filed: Jun. 15, 1995
[86] PCT No.: PCT/EP95/02320
  § 371 Date: Feb. 14, 1997
  § 102(e) Date: Feb. 14, 1997
[87] PCT Pub. No.: WO96/05015
  PCT Pub. Date: Feb. 22, 1996

[30] Foreign Application Priority Data

Aug. 16, 1994 [DE] Germany .............................. 44 29 000

[51] Int. Cl.[7] .................................................... B23K 9/20
[52] U.S. Cl. .............................................. 219/98; 219/99
[58] Field of Search ........................................ 219/98, 99

[56] References Cited

U.S. PATENT DOCUMENTS 5,252,802  10/1993  Raycher ..................... 219/98
5,317,123  5/1994  Ito ............................. 219/98
5,406,044  4/1995  Killian et al. ............... 219/98
5,662,820  9/1997  Schwiete et al. ........... 219/98

FOREIGN PATENT DOCUMENTS 0410391     1/1991    European Pat. Off. .
3414522     5/1985    Germany .
8910643    10/1989    Germany .
28 10 822   5/1991    Germany .
4-200981    7/1992    Japan .
1742003     6/1992    U.S.S.R. .

*Primary Examiner*—Clifford C. Shaw
*Attorney, Agent, or Firm*—Gary M. Nath; Gregory B. Kang; Nath & Associates

[57] ABSTRACT

The device proposed is designed to weld together at least two parts (1, 2) using arc-welding or resistance-welding, in particular pressure arc-welding, techniques. An arc is struck across a gap between the two parts (1 and 2), thus causing them to melt. In oder to ensure a very precisely defined vertical gap between the parts, the second part (2) is first placed on the first. The final position, determined by a program-control unit (12), is measured by means of a travel-measurement instrument (10). Starting from this "zero position", the bolt is lifted through a freely programmable distance and the main welding current activated. On expiry of the prescribed period of time, the bolt on the second part (2) is moved towards the first part (1), this movement also being carried out under program control.

17 Claims, 3 Drawing Sheets

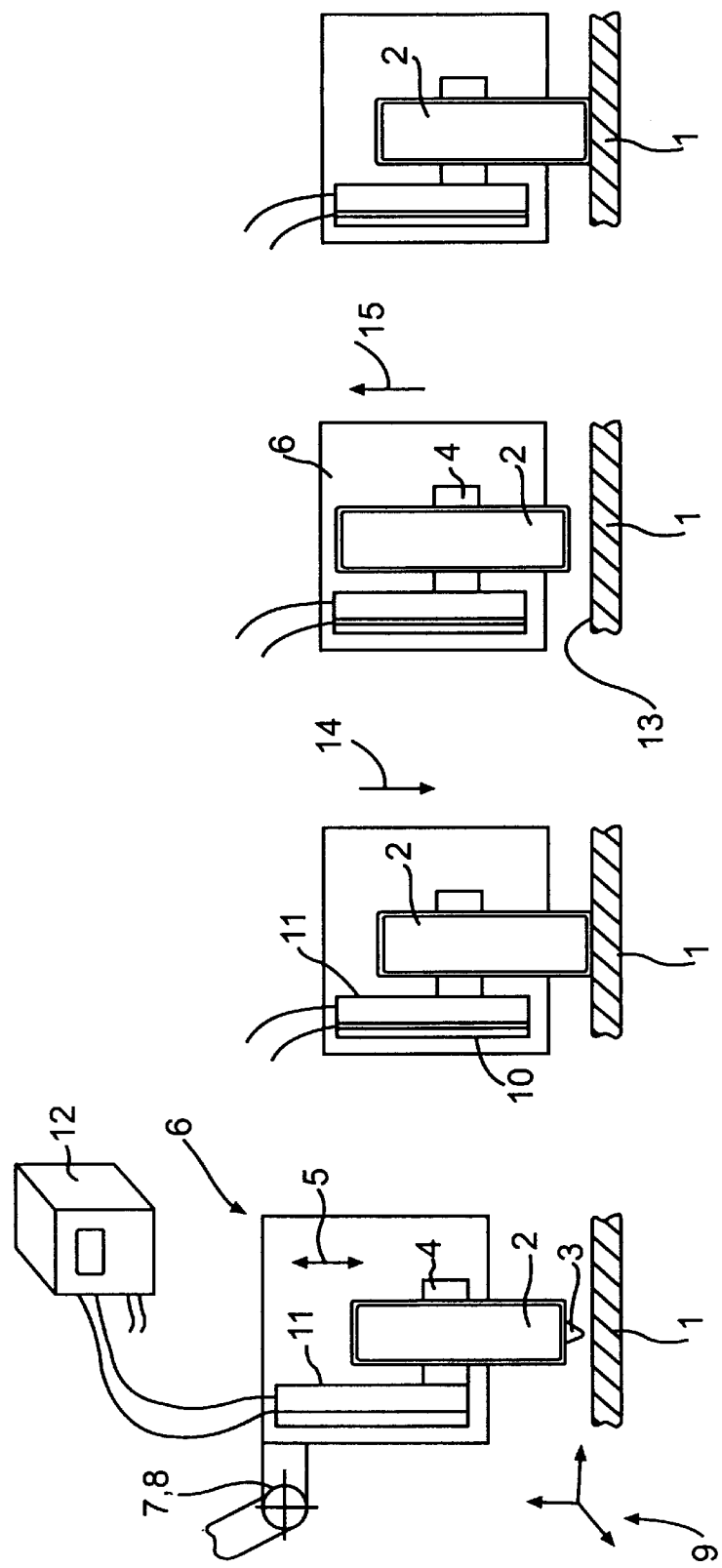

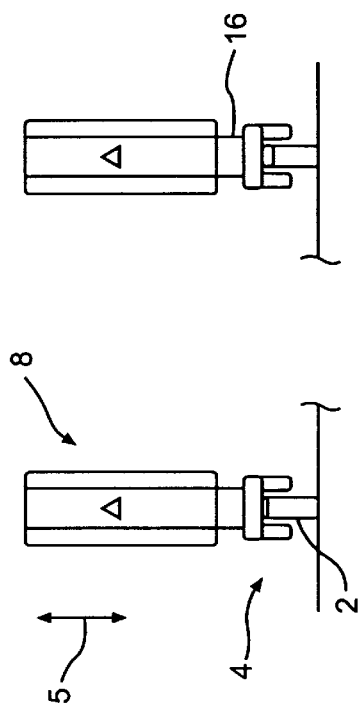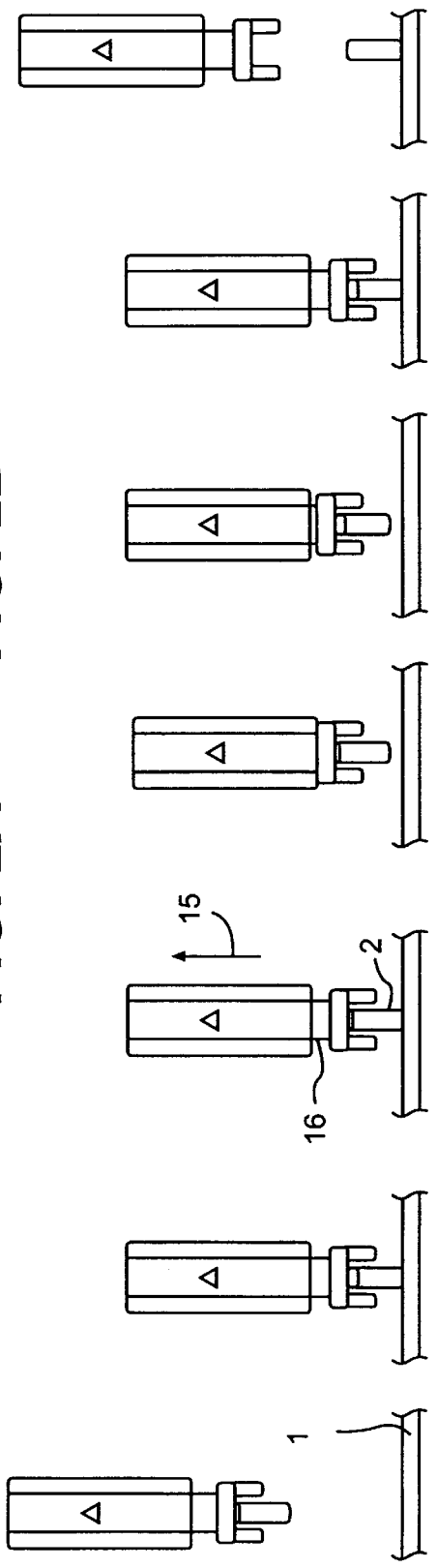
FIG. 2A  FIG. 2B  FIG. 2C  FIG. 2D  FIG. 2E  FIG. 2F  FIG. 2G  FIG. 2H  FIG. 2I

DEVICE FOR WELDING TOGETHER AT LEAST TWO PARTS AND METHOD OF USING THE DEVICE

DESCRIPTION

The invention relates to a device and the use of a device for welding together at least two parts, using an arc welding or resistance welding procedure, in particular an arc pressure welding procedure, in which a first part remains stationary and a second part, held in a holding device, can be moved backwards and forwards relative to this first part by means of an actuating device in a welding head, and in which the second part can be aligned relative to the first part by means of a positioning drive (manipulator) for positioning the welding head.

A device of this kind, by means of which arc pressure welding can be carried out, is already known. This latter process is used, for example, in the field of automotive engineering or automobile body assembly. In this process, a small part, for example, is welded to a larger part, and in particular a bolt is welded to a part of an automobile body. The second part is precisely aligned in relation to the first part, and this can be done by means of a known type of positioning drive (manipulator). The actuator then causes the second part to move relative to the first part, for example by executing a feed motion, possibly after first lifting up the second part. In the case of resistance fusion welding, the fusion between the two parts is generated by electrical resistance. In the case of resistance pressure welding, as the current flows through, the electrical resistance in the weld zone generates the heat necessary for the welding process. The bonding of the points to be connected is achieved by pressing the parts together. This type of welding includes, for example, also spot welding and projection welding. In the case of arc welding, an electric arc burns between the two parts, one of which is usually a welding electrode which melts during the welding process.

In the case of arc pressure welding, an electric arc is struck between the first and second parts, both of which melt at the faces in contact with the ends of the arc. Then, the second part is moved relatively rapidly towards the first part so that the two weld puddles are united. With the hardening of the combined weld puddles, the two parts become welded together. Whatever the case, the important factor here is the relative movement of the first and second parts, one of which as a rule remains stationary while the other part is moved towards it, and this feed motion may be preceded by movement in the opposite direction. The latter motion may be dispensed with if, due to its special shape, the part being fed is shortened by being partially melted away before the general strong melting of both parts commences.

In a known device used for arc pressure welding, the second part is approached to within a predetermined distance from the first part; this can easily be accomplished using either a supporting foot or a tripod. The second part, e.g. a bolt held in a welding head, which is to be welded to the first part, is exactly positioned relative to the first or base part, e.g. a car body. In this process a usually pneumatically operated carriage moves the actual welding stroke mechanism, carrying the bolt to be welded, towards the first, stationary part. The force with which the bolt is pressed against the base part when the two parts are being welded together is not freely adjustable, unless the system is mechanically converted. The supporting foot requires a free space of about 30 mm around the bolt to be welded, and no disruptive contours may be present in this space.

The welding process is initiated by triggering a preliminary welding current. Using a lifting device, usually a solenoid, and while the preliminary welding current is still being applied, the bolt is raised against a return-action device, in particular a return spring, until a fixed stop is reached. Here again, unless the system is mechanically converted, the welding stroke length can be adjusted only once.

The preliminary welding current which is applied generates a weak electric arc. The main welding current is triggered once the maximum stroke length has been travelled and it generates the weld puddle required for the welding process. When the current energizing the electric lift magnets is switched off, the return spring causes the second part to be suddenly moved towards the first part, so that the second part is plunged at maximum velocity into the weld puddle of the first part. Some splattering of the weld puddle is unavoidable.

The plunge into the weld puddle occurs in a largely unregulated manner and, among other things, depends on the spring rate. Because of the largely uncontrolled plunging process and the speed at which the plunging is carried out, it is almost impossible to prevent faulty welds from being produced. The unsound welds are also caused in particular by vibration events which are initiated when the second part impacts on the first part.

Because—at least after an initial setting has been carried out—most of the settings made to one and the same device cannot be changed, e.g. the spring rate, the pretensioning of the spring, the performance data of the solenoids, the stroke length, etc., fluctuations in the tolerances of the two parts have a negative effect in a series. It is also not an easy matter to replace, for example, one type of bolt by another without first readjusting the basic setting. Once the initial adjustment has been made, it is no longer possible to influence the acceleration and the speed at which the bolt is fed; instead, the second part always impacts at high speed onto the first part, and this can cause loss of the molten metal in the weld puddle due to splattering, thereby resulting in a faulty weld. How much material is lost because of splattering depends in each case on the combination of tolerances. Gentle plunging into the weld puddle is not possible. Furthermore, with this type of device the welding position also plays a role, i.e. different results are obtained depending on whether the weld is carried out in an upward, downward or lateral direction. However, when welding guns are used, welding is usually carried out in all directions.

A bolt-welding device of the type referred to at the beginning is known from DE 34 14 522 C1. In this device, a bolt which is to be welded is fed by means of the welding head to the workpiece. The feed motion takes place at first at low force until an actuating tappet opens a valve, so that the rest of the feed distance can be travelled with a high level of force being exerted. This device reduces the risk of injury to the operator. JP-A-42 00 981 describes a bolt-welding device which operates at low pressure during the learning program and at high pressure during the work program. This reduces the risk of damage to the components.

As a result, there is a need to improve the design of a device of the type described at the beginning in such a way that the disadvantages listed are avoided and optimal welding results can be achieved with the lowest possible rejection rate. The aim is, above all, to achieve reproducible results; this requires minimizing or even eliminating the aforementioned vibrations when the two parts impact on one another. In addition, the welding direction should not have a negative influence on the welding result.

In order to solve this task, in the manner according to the invention, it is proposed that, in the device referred to at the beginning, by using a manipulator for the welding head, the second part can be aligned relative to and can be pressed against the first part; in each case the position of the holding device relative to the welding head can be determined by means of a path-measuring system, and after the second part has been pressed against the first part, the movements of the second part relative to the first part can be executed by means of the distance-measuring system according to set-point control commands.

The path-measuring system and an actuator for the device that holds the second part are essential elements of this device. By means of a manipulator, e.g. a robot arm, which may be conventional both in design and in the manner of control, the second part, e.g. a bolt to be welded into place, is precisely oriented relative to the weld point on the first part. Next, in the case of the arc pressure welding process, the second part is pressed in the manner described against the first part, while the welding current is still switched off. Regardless of the tolerances of the parts to be welded together, the position of the device holding the second part is determined relative to the welding head by means of the path-measuring device; this position is taken as a zero setting. Next, the second part is lifted off the first part, after the preliminary welding current has been switched on. This lifting action is carried out in a controlled manner by a freely selectable amount, starting from the established zero point. In this way, the height by which the second part is raised up can be precisely maintained, regardless of the tolerances. Once the main welding current has been triggered, the second part is moved towards the first part, and the main welding current causes weld puddles to form on both parts in the area of the intended weld point. Once again, the feeding of the second part towards the first part is carried out accurately with the aid of the path-measuring system, and the feed distance can be slightly longer than the lift-off distance, because the second part must be plunged into the weld puddle of the first part, and it has also become slightly shorter due to the formation of the weld puddle. Once the weld puddle solidifies, the second part is released from the holding device. It is now firmly welded to the first part.

If a bolt with a meltable tip is used in the arc welding process, the lift-off movement prior to the main welding current being triggered can be wholly or at least partially dispensed with, because a relative lift-off of the bolt is achieved by the melting of the tip. In this case also, the position of the bolt is accurately determined or accurately taken up prior to the preliminary welding current being triggered, and it is used as the reference point for the following movement or movements of the bolt.

With the help of the program controller, the data or adjustment values which have been determined or entered can be processed in a predetermined manner, and they can be taken into account in any desired manner when determining the acceleration and deceleration and/or the speed each time the system is re-set. This also permits the harmful vibratory movements to be eliminated, and above all any dimensional tolerances between the two parts can also be eradicated. The respective part can be gently plunged, as required, into the weld puddle.

It is clear from the foregoing that this device can also be used with the other welding processes mentioned and is not restricted to the arc pressure welding process using weld-on bolts. For the sake of simplicity, however, reference is made in the following solely to the arc pressure welding method with weld-on bolts, although this should not be interpreted in a restrictive sense.

In a further embodiment of the invention, the actuator of the holding device is a double-acting working cylinder, especially a servo-pneumatic or servo-hydraulic cylinder. The extendable part of the working cylinder, for example the piston rod of the cylinder, carries the holding device for the weld-on bolt. The welding head is oriented relative to the weld point in such a manner by the manipulator, e.g. a robot arm, that the weld end of the bolt is arranged exactly over and at a short distance from the weld point. Using the manipulator, the bolt is now placed in contact with and pressed onto the weld point. The robot arm can be moved at maximum speed up to its end position. The overall sequence of movement is continuous. When the bolt is pressed onto the weld point, this compensates for all the tolerances between the tools and the workpieces. By pressing the bolt against the weld point, the piston rod of the servo-pneumatic system is forced back into the cylinder. At the same time, with the aid of the path-measuring system, the position now occupied by the holding device in relation to its starting position, or in relation to the welding head, is determined. The new position, after the piston has been pressed into the cylinder, preferably corresponds to a travel distance of zero. Using the actuator, the bolt can then be raised by a freely selectable amount from the first part, and this amount is then an exact parameter which is independent of the bolt tolerances and similar.

Preferably, before the bolt is pressed against the vehicle body, the pressure in the servo-pneumatic system is reduced so that the piston can be pushed back into the cylinder without any problem. Once the robot arm has reached its end position, i.e. once the bolt has been placed in contact with and pressed against the vehicle body, and the piston has been forced back into the cylinder, the position at that moment is entered as the set-point and the pressure in the servo-pneumatic system is increased again.

In the case of a bolt having a meltable tip, it may be possible, once the tip has melted, to forego the lift-off action prior to triggering the main welding current.

By using a double-acting cylinder, and starting from the raised position of the bolt, the downward movement of the bolt can be executed in a predetermined, but freely selectable manner, by applying appropriate pressure to the piston.

The invariable force and movement characteristics of the return spring used in state-of-the-art systems are replaced in this case by the precisely selectable and controllable force and movement characteristics of the servo-pneumatic system, whose piston (or cylinder) can be manipulated with any desired choice of speed, acceleration and deceleration, as well any desired amount of force.

As the device holding the bolt is moved towards the weld point by means of the robot arm, the pressure in the working cylinder is reduced. Once the bolt has been positioned on the weld point, the welding head, as already explained, is moved further towards the second part, thus resulting in the piston, carrying the holder and the bolt, being displaced relative to the welding head. Once the robot arm has reached its end position, the position of the holding device, i.e. of the servo-pneumatic system, is determined using the path-measuring system and this position is used as the reference position for all further positioning movements.

According to a further embodiment of the invention, in order to obtain an exactly predetermined feed action in terms of acceleration, speed and deceleration after the main welding current has been initiated, the position of the piston in both chambers of the cylinder of the actuator is determined by means of a measuring and control device and can be regulated as a function of time and/or travel distance. When the weld faces of both parts have been melted in the desired manner, the bolt can initially be moved with maximum acceleration and at maximum speed right up close to the first part and then, in particular to avoid splattering of the weld puddle, the movement can be maximally decelerated to ensure that the bolt plunges gently into the weld puddle. Because these parameters are freely selectable or can be programmed into the computer, it is a simple matter to switch from one type of bolt to another. The same applies in the case of different first parts, e.g. different thicknesses of automobile body sheet metal, and the other described adjustments.

When a weld-on bolt is used, the holding device employed is a spring chuck, a spring sleeve, or similar, all of which are very commonly used in practice; whereas, when the second part takes the form of a sheet metal part, an appropriate holding device is provided which is correspondingly designed and built to match the shape of this second part.

The task of the invention is furthermore to create a procedure which can be implemented using the device according to the invention.

In the manner according to the invention, this task is solved by a procedure having the procedural steps listed in claim 7.

Indirectly, these procedural steps have already been mentioned in connection with the explanation given of the device according to the invention. On the other hand, however, this procedure is also described in the following, in connection with describing an embodiment of the invention.

Further features of this procedure and other functional operations and advantages of the device according to the invention and of the procedure, may be derived from the following description of an embodiment of the invention.

The invention is described in more detail in the following on the basis of the drawing, in which:

FIGS. 1a–1d Depict in diagrammatic form, and in four sequential phases designated a to d, the welding head with the holding device, the path-measuring system, the actuator, and the second part, having the form of a weld-on bolt.

FIGS. 2A–2I Depict the sequence of the procedure according to the invention, in nine sequential phases designated A to I.

Figure 3:
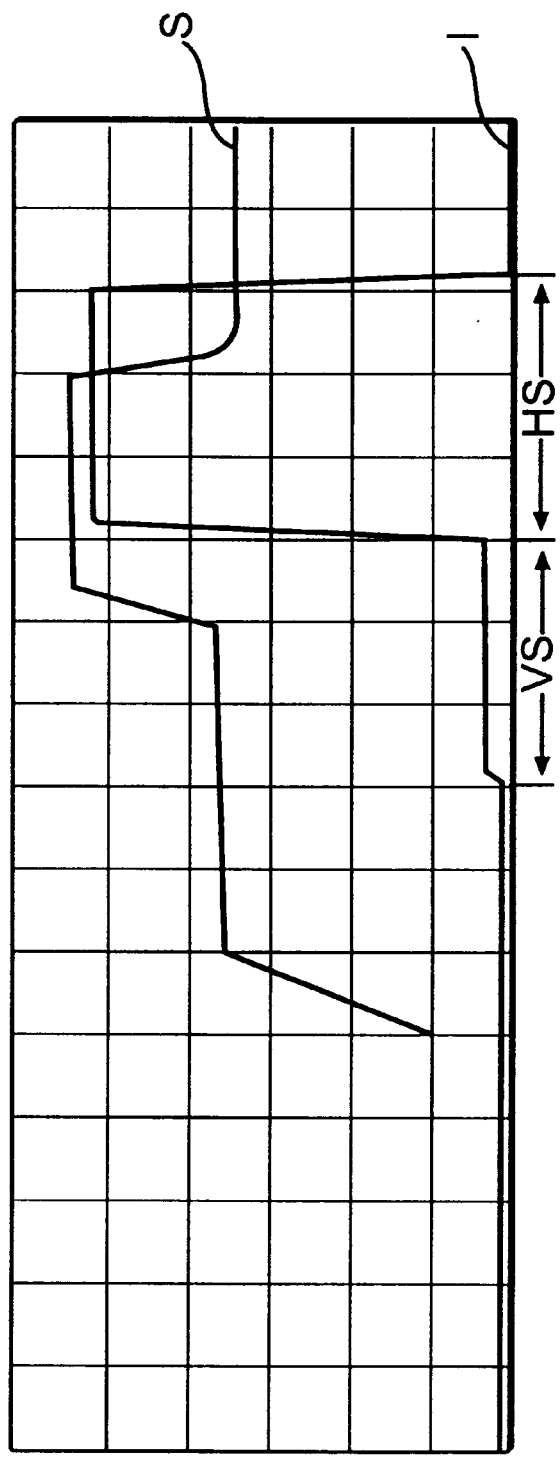
FIG. 3 Is a diagram showing the current curve and the movement curve for the procedure depicted in FIG. 2.

To a first part 1, for example a vehicle body, a second part 2, in particular a bolt, is to be welded using, in the embodiment described here, the arc pressure welding method. In the drawing, the first part 1 is merely schematically indicated and the second part 2 may also be designed differently from the way in which it is depicted here. For example, it may be provided with a welding foot or also with an arc-initiation tip 3, which is indicated by broken lines in phase a in FIG. 1. The second part—which is hereinafter merely referred to as "bolt 2"—is held in a holding device 4 which may have the form of or may be fitted with a spring chuck, a spring sleeve or similar. The holding device 4 is mounted on a welding head 6 so that it can be advanced or retracted in the directions indicated by the double arrow 5; the vertical feed direction is seen here in relation to the first part. The welding head 6 can itself also be adjusted, preferably in all three coordinate directions, in a known manner using a manipulator 8, in particular a robot arm 7. It is in particular intended that the welding head 6 be held and moved by a robot arm 7. This is achieved with the aid of a symbolically depicted robot arm 7. The positioning motions of the robot arm 7 are depicted symbolically by the three arrows 9 which are intended to denote the three directions in a system of coordinates.

It is thus possible in this way to align the bolt 2 or its geometrical axis precisely in relation to the weld point of the first part 1.

In phase a of FIG. 1, the bolt 2 is shown positioned a short distance above the weld point. The alignment was accomplished by positioning the welding head 6 with the aid of the robot arm 7. In addition to the holding device 4, the robot arm also carries a preferably electronically operating path-measuring system 10 as well as an actuator 11 for the holding device 4. These elements are linked, via schematically indicated leads, with a program controller 12, also merely schematically indicated, having a control unit for inputting parameters. This will be discussed in more detail in the following.

In the position which the welding head 6 has reached in phase a, the holding device 4 is in one of its end positions, preferably its lower end position in the embodiment shown in the drawing. As a result, the full measuring range or measuring pathway of the path-measuring device 10 is also available.

If, proceeding from phase a in FIG. 1—and initially without taking account of an arc-initiation tip 3—the bolt 2 is advanced towards the assigned surface 13 of the first part, to which surface it is to be welded, by moving the welding head 6 in the appropriate direction, the second part 2 will ultimately come into contact with the first part 1. If, however, the welding head 6 is then moved further downwards by means of the robot arm 7, the bolt 2 can no longer follow this further downwards motion. Consequently, the holding device 4 is displaced upwards relative to the welding head 6. Each position, and especially this relative displacement, can be recorded by the path-measuring system 10. The end position is reached when the robot arm 7 has reached its programmable end position. Up to this end position, the robot arm 7 can travel at maximum speed.

The actuator 11 may preferably be a double-acting, servo-pneumatic working cylinder. Before the bolt 2 is pressed against the part 1, the pressure in both chambers of the cylinder is reduced. If it is assumed that in phase a of FIG. 1 the piston has reached its lower end position in this working cylinder, then when the bolt 2 is in contact with the first part 1 and the welding head 6 is advanced in the direction of the arrow 14, the piston will in relative terms be displaced upwards, i.e. to be strictly accurate, the cylinder will move downwards relative to the piston.

The end position of the robot arm 7 or of the welding head 6 is exactly determined with the aid of the path-measuring system 10. This position corresponds to a zero position of the bolt 2 relative to the first part 1 or the vehicle body.

A value for further raising the holding device 4 relative to the welding head 6 can be entered into the program controller 12. Starting from the position it has reached in phase b relative to the first part and to the welding head 6, after being pressed against the first part, the bolt 2 can be raised up in the direction of the arrow 15, with the help of the actuator 11, via the servo-pneumatic system, by an exactly prescribed and freely selectable value which, as mentioned, is entered into the program controller 12. The position shown at phase c in FIG. 1 is then attained. Between phase a and phase c, the pressure in the working cylinder was reduced in order to permit the piston to be pressed into the cylinder without any difficulty. Starting from the position in phase c, the bolt 2 is lowered by means of the working cylinder towards the first part 1. By means of the program controller, a feed action having any desired characteristics can be achieved. In particular, the system is designed so as to permit the precisely defined spacing (phase c) between the bolt 2 and the first part 1 to be traversed at high speed; then, just before it reaches the surface 13 of the first part 1, the bolt continues to be lowered but at a considerably reduced speed. The rapid travel phase is preceded by a phase of high acceleration and it ends with a phase of strong deceleration.

As the transition is made from phase b to phase c, an electric arc is initiated by triggering a preliminary welding current.

Once the defined raised position of the bolt 2 according to phasec is attained, the main welding current is triggered, thus initiating a powerful arc which causes the end of the bolt and the opposite zone of the first part to melt. When the bolt 2 is then lowered, its liquefied or softened leading end is gently plunged into the liquefied material at the surface 13 of the first part 1, the weld puddles are combined and the welding process takes place.

It is easy to see that, by being able to freely choose the various parameters, but especially the acceleration and preferably also a variable speed for the bolt 2, as well as the regulation of the welding current in conjunction with the regulation of the travel during the downwards movement, which is also undertaken with the aid of the path-measuring system 10, the depth of penetration of the bolt 2 into the weld puddle of the first part 1 can be exactly specified, and this is very important, especially in the case of thin metal sheets as used in automobile, i.e. vehicle body, construction.

When the bolt 2 is fitted with an arc-initiation tip, the procedure according to the invention can still be carried out with the device according to the invention. The retraction stroke, i.e. the lift-off motion of the bolt 2, can be omitted during the transition from phase b to phase c. However, it is also possible to execute a shortened retraction stroke. When the welding current is triggered, the arc-initiation tip 3 melts away, and it is solely due to this process that bolt 2 occupies the position attained in phase c, namely after the arc-initiation tip in contact with or pressed against part 1 has been melted away, with bolt 2 displaced as shown in phase b. If it is decided not to additionally raise the bolt once the arc-initiation tip has melted, the transition from phase b to phase d can immediately be made with this bolt 2. At any rate, the melting away of the arc-initiation tip corresponds at least partially to the raising of the second part relative to the first part during the transition from phase b to phase c.

FIG. 2 shows the procedural sequence in slightly more detail than FIG. 1, although again only in diagrammatic form. In contrast to FIG. 1, in FIG. 2 the holding device 4 is attached directly to the lower end of the piston rod 16 of the manipulator 8, whereas in FIG. 1 the lateral connection of the piston rod with the holding device 4 is not shown because such detail is not important. All that matters is that the holding device 4 in each case executes the lifting and lowering motions along with the piston and the piston rod.

In phase A, the holding device is opened, but it is already aligned in such a way relative to bolt 2 that this bolt is gripped when the holding device closes. This is shown in phase B. The gripping of the bolt and the transportation of the bolt to the weld point can take place in a known manner according to a programmed control sequence.

Phase C represents the positioning of the bolt 2 above the first part 1. In phase D the bolt 2 is placed in contact with the weld point. Next, according to phase E, the welding head 6 is lowered further towards the first part 1, and this causes the piston and thus also the piston rod 16 with the bolt 2 to be forced into the cylinder in the direction indicated by the arrow 15. This is followed by the lifting of the bolt 2 in accordance with phase F and phase c in FIG. 1. As indicated schematically, the preliminary welding current (VS) is triggered during these steps and an electric arc is formed. In phase G, the main welding current (HS) is triggered so that a powerful electric arc is formed, with the result that the two parts 1 and 2 which are to be joined to one another undergo melting in the areas at the ends of the electric arc.

Phase H corresponds again to phase d in FIG. 1; namely, once the weld puddle has formed, the bolt 2 is pressed firmly into the weld puddle on part 1. In phase I, the welding head 6 with the holding device 4 is moved away from the welded-on bolt 2.

FIG. 3 illustrates diagrammatically the position of the piston in the cylinder or the tap-off S on the path-measuring system 10. In addition, this diagram also presents the path of the current strength over time; the abbreviation "VS" denotes the preliminary welding current and the abbreviation "HS" denotes the main welding current. This diagram indicates the correlation of the movements with the on/off switching of the welding current.

It is easy to see that, instead of a bolt-shaped second part 2, a second part of any other desired shape can be welded in the manner described to a first part 1. The use of the arc initiation tip is comparable, for example, to the projection welding process.

It follows clearly from the foregoing that the procedure according to the invention and the associated device avoid the disadvantages of conventional welding performed in the manner described above, because now the bolt 2 is no longer forced into the weld puddle by the robot-guided welding head under the action of a spring, and the stroke length can be exactly executed regardless of the tolerances of the components. In contrast, the plunging of the bolt 2 into the weld puddle under spring pressure is dependent on the chain of tolerances. The impacting of the bolt 2 at high speed, the chain of tolerances, and the inaccurate and varying stroke length predetermined by the fixed stop, are all eliminated in the procedure according to the invention. As a result, exactly reproducible results can be achieved almost without any defective welds.

A further advantage of the device according to the invention and of the associated procedure is that, via the selection of parameters for the stroke length in the control system, a wide range of stroke lengths can be obtained with one and the same welding head, without having to make any mechanical adjustments. Other stroke lengths can be simply obtained by modifying the program. Therefore, with this device, a wide range of bolts 2 can be welded with one and the same welding head. All the advantages described are achieved through a combination of a drive unit for the bolt 2, a path-measuring system 10, also the control and regulating system for the movement parameters.

Summarizing, the following properties and improvements are offered:

freely programmable stroke length freely programmable depth of plunge into the weld puddle freely programmable acceleration, corresponding to the performance data of the actuator 11, for lifting and plunging gentle plunging into the weld puddle is possible movement and force sequences are independent of the welding position, i.e. equally good results can be obtained when welding upwards or downwards compensation of the tolerances between the components or workpieces bolts of all usual diameters can be handled freely programmable speed sequences during the movement of the device integration of all necessary movements into one stroke mechanism having a simple mechanical structure, small dimensions, and a low weight the welding process and the quality of the welds can be influenced in a fully programmable manner via the software, without having to make any mechanical conversion a wide range of bolts (diameters, lengths, shapes) can be welded with one and the same head because no supporting foot or tripod is used, the bolts can be placed closer to any disruptive contours.

We claim:

1. A device for welding together at least a first part that is held stationary and a second part comprising:

a holding device that holds the second part, an actuating device located on a welding head wherein the actuating device is capable of moving the second part back and forth relative to the first part, a manipulator capable of moving the welding head in any direction, so that the second part can be aligned relative to the first part, said actuating device is capable of pressing the second part against the first part; and a path-measuring system capable of recording the position of the holding device relative to the welding head and also capable of directing the actuating device to move the second part back and forth relative to the first part according to a series of set-point control commands.

2. A device according to claim 1, wherein an actuator for the holding device is a working cylinder.

3. A device according to claim 2, wherein the position of the working piston of the actuator is recorded by the path-measuring system and can also be regulated as a function one or more of time and distance traveled.

4. A device according to claim 2, wherein the actuator (11) for the holding device (4) is a double-acting servo-pneumatic or a servo-hydraulic working cylinder.

5. A device according to claim 1, further comprising a program controller which possesses a control unit for inputting parameters, a unit for evaluating actual values of the parameters, a unit for regulating set-points, and interfaces to the welding head, a welding current source and the manipulator.

6. A device according to claim 1, wherein the manipulator takes the form of a robot arm.

7. A device according to claim 1, wherein the second part is a weld-on bolt or any desired weld-on part, and the holding device is a collet chuck, clamping sleeve or clamping device.

8. A method of using the device according to claim 1, comprising the steps of:

a) positioning the second part, held in the holding device, at a certain height above the first part by means of a manipulator;

b) advancing the welding head, with the holding device, in the feed direction by means of the manipulator until the second part comes into contact with the first part;

c) further advancing the welding head by means of the manipulator, while displacing the holding device relative to the welding head until the manipulator has traveled a preset distance;

d) determining the position of the holding device relative to the welding head by means of a path-measuring system once the pre-set travel distance has been covered (zero-point determination);

e) triggering a preliminary welding current;

f) melting away an arc-initiation tip of the second part or raising the holding device with the second part in a controlled manner by a predetermined amount relative to the welding head by means of the actuator;

g) triggering a main welding current;

h) feeding the second part towards the first part by means of the actuator and plunging the second part into the weld puddle of the first part to the pre-set plunge depth;

i) switching off the welding current;

j) solidifying the weld puddle; and k) releasing the second part and moving the welding head away by a predetermined amount from the first part by using the manipulator.

9. A procedure according to claim 8, characterized in that before the second part is further advanced, in accordance with procedural step c, the pressure in the working cylinder is reduced.

10. A method according to claim 8, wherein once the welding position for the first part has been reached, the position of the holding device is recorded by the actuating device as a set-point.

11. A method according to claim 8, wherein once the manipulator has traveled the pre-set distance, pressure in a working cylinder is increased.

12. A method according to claim 8, wherein the force with which the second part (2) is pressed against the first part (1), and the stroke length of the holding device (4) for the further lifting of the holding device (4) are freely programmable.

13. A method according to claim 8, wherein the on/off switching points and the strength of the preliminary welding current or the main welding current are freely programmable.

14. A method according to claim 8, wherein at least the acceleration, feed travel speed and deceleration of the second part in step h) are freely programmable.

15. A method according to claim 14, wherein the feed movement in step h) is freely programmable and can be subdivided into partial movements executed at different speeds, so that, after an initial burst of rapid acceleration, the bolt (2) is moved at high speeds towards the first part (1), and then after rapid deceleration, the bolt (2) is plunged at low speed into the weld pool of the first part (1).

16. A method according to claim 8, wherein the feed end position of the second part (2) in the weld puddle of the first part (1) is freely programmable.

17. A method according to claim 8, wherein the bolts (2) are transferred automatically and under program control to the holding device (4).

* * * * *